(12) United States Patent
Tran et al.

(10) Patent No.: US 8,264,941 B2
(45) Date of Patent: Sep. 11, 2012

(54) ARRANGEMENT AND METHOD TO PERFORM SCANNING READOUT OF FERROELECTRIC BIT CHARGES

(75) Inventors: Quan Anh Tran, Fremont, CA (US); Byong M. Kim, Fremont, CA (US); Robert N. Stark, Saratoga, CA (US); Nathan R. Franklin, San Mateo, CA (US); Qing Ma, San Jose, CA (US); Valluri Rao, Saratoga, CA (US); Donald E. Adams, Pleasanton, CA (US); Li-Peng Wang, San Jose, CA (US); Yevgeny V. Anoikin, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 1293 days.

(21) Appl. No.: 11/964,580

(22) Filed: Dec. 26, 2007

(65) Prior Publication Data
US 2009/0168637 A1 Jul. 2, 2009

(51) Int. Cl.
*G11B 9/02* (2006.01)
(52) U.S. Cl. .................................. 369/126; 977/947
(58) Field of Classification Search .................. None
See application file for complete search history.

(56) References Cited

U.S. PATENT DOCUMENTS

| | | | | |
|---|---|---|---|---|
| 5,038,322 A * | 8/1991 | Van Loenen | ................ | 365/114 |
| 5,144,581 A * | 9/1992 | Toda et al. | ................ | 369/126 |
| 5,251,200 A * | 10/1993 | Hatanaka et al. | ............ | 369/126 |
| 5,375,087 A * | 12/1994 | Moreland et al. | ............... | 850/10 |
| 5,412,597 A * | 5/1995 | Miyazaki et al. | ............ | 369/126 |
| 7,738,350 B2 * | 6/2010 | Adams et al. | ................ | 369/126 |
| 7,796,492 B2 * | 9/2010 | Chou et al. | .................... | 369/126 |
| 7,889,627 B2 * | 2/2011 | Ramakrishnan et al. | ..... | 369/126 |
| 2003/0179685 A1* | 9/2003 | Nam | ............................ | 369/126 |
| 2005/0057954 A1* | 3/2005 | Sultenfuss et al. | ............ | 365/145 |
| 2005/0281174 A1* | 12/2005 | Gotsmann et al. | ........... | 369/126 |
| 2006/0018239 A1* | 1/2006 | Nam et al. | ..................... | 369/126 |
| 2006/0291271 A1 | 12/2006 | Stark et al. | | |
| 2007/0119240 A1* | 5/2007 | Park et al. | ....................... | 73/105 |
| 2008/0052602 A1* | 2/2008 | Albrecht et al. | ............. | 714/763 |
| 2008/0074792 A1 | 3/2008 | Stark et al. | | |
| 2008/0174918 A1* | 7/2008 | Kim | .............................. | 360/250 |
| 2008/0192528 A1* | 8/2008 | Siegert et al. | ................. | 365/145 |
| 2008/0232228 A1* | 9/2008 | Adams et al. | ................ | 369/126 |
| 2008/0316897 A1 | 12/2008 | Kim et al. | | |
| 2008/0318086 A1 | 12/2008 | Kim et al. | | |
| 2009/0040911 A1 | 2/2009 | Chou et al. | | |
| 2009/0116366 A1* | 5/2009 | Ramakrishnan et al. | ..... | 369/126 |
| 2009/0168637 A1* | 7/2009 | Tran et al. | ..................... | 369/144 |
| 2010/0100991 A1* | 4/2010 | Kim et al. | ....................... | 850/62 |

* cited by examiner

*Primary Examiner* — Peter Vincent Agustin
(74) *Attorney, Agent, or Firm* — Blakely, Sokoloff, Taylor & Zafman LLP

(57) ABSTRACT

An arrangement, a method and a system to read information stored in a layer of ferroelectric media. The arrangement includes a layer including a ferroelectric media having one or more ferroelectric domains holding bit charges, a domain corresponding to information; a probe having a tip, wherein the media and the tip are adapted to move relative to one another such that the tip scans the ferroelectric domains of the media while applying a contact force to the domains to generate a direct piezoelectric effect within the domains; and circuitry coupled to the tip and adapted to generate a signal in response to an electrical coupling between the tip and the domains while scanning the tip in contact with the domains, the signal corresponding to a readout signal for ferroelectric bit charges stored in the media.

31 Claims, 4 Drawing Sheets

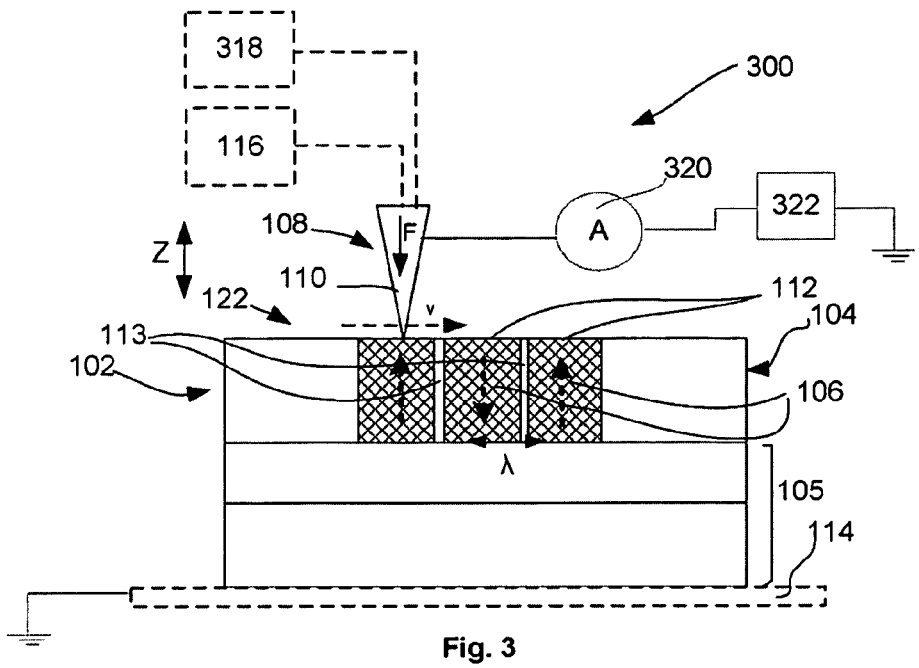

Fig. 3

Scanning the tip over the bit regions while applying a contact force to the bit regions with the tip to generate a direct piezoelectric effect within the bit regions. — 602

Using circuitry coupled to the tip to generate a signal in response to an electrical coupling between the tip and the bit regions while scanning the tip in contact with the bit regions, the signal corresponding to a readout signal for ferroelectric bit charges stored in the bit regions. — 604

Fig. 5 — 600

ARRANGEMENT AND METHOD TO PERFORM SCANNING READOUT OF FERROELECTRIC BIT CHARGES

FIELD

Embodiments relate to high density data signal readout arrangements and methods, and specifically to arrangements and methods involving the use of a probe tip sensor to perform a piezoresponse signal readout from memory media which include ferroelectric bit charges.

BACKGROUND

Conventional piezoresponse signal readout techniques, such as piezoresponse force microscopy (PFM) rely on the detection of bit signals from a ferroelectric memory medium by virtue of a cantilever probe tip sensor's mechanical motion on the surface of the medium. Such probe storage devices typically use two parallel plates. A first plate includes the cantilevers with contact probe tips extending therefrom for use as read-write heads and a second, complementary plate includes memory media for storing data. The plates can be moved relative to one another in an X-Y plane while controlling the Z-spacing between the plates. Motion of the plates relative to one another allows scanning of the memory media by the contact probe tip and data transfer between the two.

Disadvantageously, PFM relies on complex laser and optical setup for alignment and detection of the cantilever probe tip deflection, which deflection is typically less than about 1 nm. In PFM, the laser beam is focused onto the cantilever probe tip by using the optical setup. The reflected laser beam from the cantilever probe tip is then aligned to a center of a photodiode detector. In PFM, an AC voltage is applied between the cantilever probe tip and the ferroelectric sample. The AC voltage results in an expansion and contraction of the ferroelectric at the same frequency as a frequency of the AC voltage. Consequently, the cantilever probe tip deflects in unison with the expansion and contraction of the ferroelectric sample, in this way causing the reflected laser beam to oscillate about the center of the photodiode detector. The changing position of the reflected laser beam relative to the center of the photodiode detector in turn generates current which PFM uses to calculate the cantilever tip deflection.

Alternatively, a conventional scanning nonlinear dielectric microscopy (SNDM) technique may be used to read bits. SNDM, however, disadvantageously requires complicated resonance circuitry operating at the GHz range to detect attofarad ranges in capacitance. SNDM aims to detect changes in capacitance as the tip goes from an UP domain to a DOWN domain. However, this change in capacitance has proven to be extremely difficult to detect, requiring complicated circuitry operating at high frequencies. SNDM further requires that the tip be made coaxial in order to provide a constant impedance environment for the system, in this way adding to the complexity of the same.

The prior art fails to provide an arrangement and method that avoid the need for complex optical setups and/or for complex resonance circuitry operating in the GHz range as noted above.

BRIEF DESCRIPTION OF THE DRAWINGS

FIG. 3 is a schematic representation of an arrangement according to a second embodiment;

FIG. 5 is a flowchart showing stages of a method embodiment; and

Figure 1:
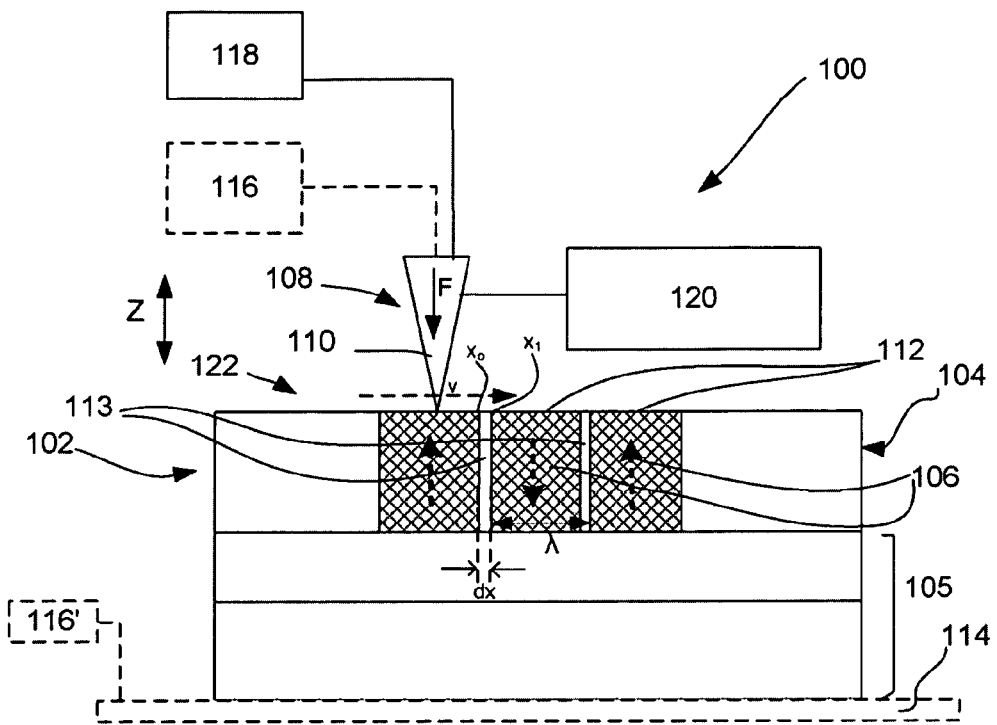
FIG. 1 is a schematic representation of an arrangement according to a first embodiment.

For simplicity and clarity of illustration, elements in the drawings have not necessarily been drawn to scale. For example, the dimensions of some of the elements may be exaggerated relative to other elements for clarity. Where considered appropriate, reference numerals have been repeated among the drawings to indicate corresponding or analogous elements.

DETAILED DESCRIPTION

In the following detailed description, an arrangement and method to perform scanning readout of ferroelectric bit charges are disclosed. Reference is made to the accompanying drawings within which are shown, by way of illustration, specific embodiments by which the present invention may be practiced. It is to be understood that other embodiments may exist and that other structural changes may be made without departing from the scope and spirit of the present invention.

The terms on, above, below, and adjacent as used herein refer to the position of one element relative to other elements. As such, a first element disposed on, above, or below a second element may be directly in contact with the second element or it may include one or more intervening elements. In addition, a first element disposed next to or adjacent a second element may be directly in contact with the second element or it may include one or more intervening elements. In addition, in the instant description, figures and/or elements may be referred to in the alternative. In such a case, for example where the description refers to FIGS. X/Y showing an element A/B, what is meant is that FIG. X shows element A and FIG. Y shows element B. In addition, a "layer" as used herein may refer to a layer made of a single material, a layer made of a mixture of different components, a layer made of various sub-layers, each sub-layer also having the same definition of layer as set forth above.

Aspects of this and other embodiments will be discussed herein with respect to FIGS. 1-6 below. The figures, however, should not be taken to be limiting, as they are intended for the purpose of explanation and understanding.

FIGS. 1 and 3 pertain to respective embodiments where a force is either constant or actually modulated to create a direct piezoelectric effect in the memory media, in this way generating a charge that may be measured to allow a reading of the media. A direct piezoelectric effect may be demonstrated by the following equation (1):

$$P_i = d_{ij} \sigma_j \qquad (1)$$

where P is the polarization charge per unit area, d is the piezoelectric coefficient, and σ is the force per unit area. Equation (1) suggests that when a force is applied onto a sample of material that exhibits piezoelectric characteristics, charge is built up in that sample. Ferroelectric materials exhibit piezoelectric characteristics and obey equation (1). The polarity of the built up charge reverses when the ferroelectric domain upon which force is applied reverses its direction from UP to DOWN and vice versa. Thus, the domain orientation can be determined by measuring the built up charge. Alternatively, if the built up charge changes over time, current is generated and can be used to determine the domain orientation. The direct piezoelectric effect current is brought about in the embodiment of FIG. 1 by the fact that when a cantilever tip is scanned across piezoelectric domains of alternating polarization while applying a constant force to the domains, the built up charge resulting from the applied force changes its sign during scanning. The direct piezoelectric effect current is brought about in the embodiment of FIG. 3, on the other hand, by the fact that, when a cantilever tip is used to apply an actually modulated force to the top of a domain, as per equation (1) above, the charge changes in magnitude over time. As compared with readout arrangements of the prior art, the readout techniques as disclosed herein advantageously dispense with the need for complicated optical setups and alignments as required with PFM or with the need for complicated resonance circuitry at GHz range as required with SNDM, for example, and offer a simple, well-established circuitry to detect current. The embodiments of FIGS. 1 and 3 will be respectively described below.

Referring first to FIG. 1, an arrangement 100 is shown according to a first embodiment. Arrangement 100 comprises a layer 102 including a ferroelectric media 104 having one or more ferroelectric domains 106 including bit charges, each of the domains corresponding to information stored in the arrangement 100. The ferroelectric media 104 may include, for example, a PZT layer (lead zirconate titinate, or $PbZr_x Ti_{1-x} O3$, where x ranges from 0.10 to 0.55) disposed over a substrate 105. Alternative materials for the ferroelectric media may similarly be employed, such as, for example, $Bi_3Ti_4O_{12}$ and $Pb1-_xLa_x(Ti_{1-y}Zr_y)O_3$ (i.e., PLZT), where x=0 to 0.2; y=0.1 to 0.55. The substrate 105 may include, in one embodiment, a layer of strontium titanate oxide (STO) (although alternative materials may be used, as readily recognizable by those skilled in the art), and a layer of strontium ruthenate oxide (SRO). A wavelength $\lambda$ of recorded information in the form of the domains 106 associated with alternating polarization. The $\lambda$ in FIG. 1 represents the pitch, that is, the periodic spacing between two domains of the same polarization. Accordingly, $\lambda/2$, which representing a half pitch, refers to a spacing between domains having alternating polarizations with respect to one another. The pitch may be leveraged using a probe tip or tip 110 with scanning speed v to modulate a signal frequency for the readout signal corresponding to the scanned information. According to one embodiment, the speed v would be chosen to modulate the signal frequency into the RF range, such as, for example, into the low RF range.

Referring still to FIG. 1, the arrangement further includes a probe 108 including tip 110. The probe 108, including tip 110, may include, in one embodiment, a straight cantilever wherein the tip 110 extends from near a free end of the cantilever. According to a preferred embodiment, the tip may be electrically conductive. For example, the tip may comprise a metal. In one embodiment, the tip may be made entirely of metal. Alternatively, the tip may include a metallic coating, and may comprise, for example, a Si tip coated with a metallic layer, such as, for example, a Pt layer. Optionally, an adhesion layer, such as one including Cr or Ti, may be provided between the Si material of the tip and the metallic layer. According to another embodiment, the tip may be semiconductive. In such a case, the tip may include Si. Although the embodiment of FIG. 1 shows a single probe tip, it is noted that embodiments are not so limited, and include within their scope the use of an arrangement including multiple tips such as tips 110, for example, which tips may be controlled either independently with respect to one another, or in unison, or in interdependent manner.

According to embodiments, the media 104 and the tip 110 may be adapted to more relative to one another such that tip 110 scans the domains 106 while applying a contact force F to the domains to generate a direct piezoelectric effect within the domains. A direct piezoelectric effect may occur as noted above with respect to equation (1) when a force F is exerted onto a piezoelectric and/or ferroelectric thin film. In such a case, a charge Q may be generated, which is quantified by the following equation:

$$Q = d_{33}F \quad (2)$$

where $d_{33}$ is a piezoelectric coefficient of the media 104 and F is the magnitude of the force applied. It is clear to see that equation (2) above is a derivation of equation (1) in an "out of plane" direction of the media top surface 112. For example, for an epitaxial ferroelectric PZT film, $d_{33}$ may be about 100 pC/N. According to an embodiment, the tip 110 may be adapted to scan each of the domains on a top surface 112 thereof (top surfaces 112 being part of top surface 122 of media 104), and, while scanning each of the domains, the tip 110 may apply a contact force F to said each of the domains, in this way bringing about a direct piezoelectric effect within any given one of the domains. Merely scanning the tip 110 over each of the domains 106 would lead to capacitive coupling across the tip-domain junction in any event, in this way generating a bit signal within the tip 110, so that the tip 110 would be acting as an antenna for detecting a bit signal from the domains, the signal having a frequency that is a function of the scanning speed v of the tip 110. According to embodiments, applying a contact force F to each of the domains using the tip 110 while scanning each of the domains 106 with the tip allows a direct piezoelectric effect generated by the contact force F to amplify the bit signal, such that the tip 110 may more readily detect, by way of electrical capacitive coupling with each domain 112 across the tip-domain junction, bit signals corresponding to bit charges or information stored in the media 104.

Referring now still to FIG. 1, as the tip pushes down on the media top surface 112, charge builds as a result of the direct piezoelectric effect described in relation to equations (1) and (2) above. As the tip moves across a domain boundary 113, the built-up charge changes its sign. Assuming that the tip 110 is moving with a velocity v and that dx is the width of the boundary region 113, the time required for the tip to cross the boundary region would be given by the following equation (3):

$$dt = dx/v \quad (3)$$

Assuming that, based on equation (2) above, the charge at location xo is given by $Q_{xo} = +d_{33}F$ and the charge at location x1 is given by $Q_{x1} = -d_{33}F$, then, because built-up charge changes over the time dt when the tip crosses the domain boundary 113 from xo to x1 in FIG. 1, a current thus generated may be given by the following equation (4):

$$\begin{aligned} i &= (Q_{x1} - Q_{xo})/dt \\ &= -(d_{33}F + d_{33}F)/(dx/v) \\ &= -2(v/dx)d_{33}F \end{aligned} \quad (4)$$

In general, the tip radius r would represent the limitation in resolving the domain boundary. Thus r can be used in the place of dx in equation (4) above. Therefore, a more practical rendition of current would be given by equation (5):

$$i = -2(v/r)d_{33}F \quad (5)$$

Equations (4) and (5) suggest that the generated current i can be increased by scanning at a higher speed v, applying a higher force F, or using a smaller tip radius r. Equations (4) and (5) also suggest that the sign of the current depends on whether the tip moves from an UP domain to a DOWN domain or vice versa. Assuming for example that the following values apply: v=1 cm/s; d33=100 pC/N; F=1 µN; and r=20 nm, then i as given by equation (5) above would equal about 100 pA.

Referring still to FIG. 1, according to one embodiment, the media and the tip are adapted to move relative to one another by virtue of a movement of the tip, the media being stationary with respect to the same, or, in the alternative, by virtue of a movement of the media, the tip being stationary with respect to the same. Actuation control systems to move a probe tip or a media in a scanning or lateral motion in the scanning direction as shown by arrow v in FIG. 1, are well known in the art. Such actuation control systems may include, for example, at least one of electrostatic actuators, piezoelectric actuators, electromagnetic actuators and thermal actuators, as would be recognized by the skilled person. Where the media is being moved with respect to the tip in a scanning or lateral motion, such media may be disposed on a movable media platform 114 (shown in broken lines in FIG. 1) in a well known manner. In the shown embodiment of FIG. 1, a scanning actuation control system 116 is shown in broken lines as being coupled to the tip 110 to actuate a lateral motion of the same with respect to the media 104 as described above. In the alternative, a scanning actuation control system 116' is shown in broken lines as being coupled to the platform 114 to actuate a lateral motion of the same with respect to the tip 110 as described above. The actuation control systems 116 and 116' are shown in broken lines in order to suggest that they may represent alternatives with respect to one another for scanning tip 110 onto the domains 106. According to one embodiment, the actual control system 116/116' may be adapted to allow a scanning of the domains 106 at a plurality of scanning speeds v. Preferably, as noted above, the scanning speed v is set such that the frequency of the bit signal corresponds to a RF. For example, the scanning speed may be about 2.5 cm/s according to one embodiment.

With respect to the application of the contact force F between tip 110 and domains 106, actuation control systems may be used to move a probe tip toward a media in a "Z direction," that is, in a direction toward or away from one another as shown by arrow Z in FIG. 1, in order to urge the tip 110 toward the domains 106 to effect a contact force F. Such actuation control systems may include, for example, at least one of electrostatic actuators, piezoelectric actuators, electromagnetic actuators and thermal actuators, as would be recognized by the skilled person. In the shown embodiment of FIG. 1, a Z actuation control system 118 is shown as being coupled to the tip 110 to actuate a Z direction motion of the same with respect to the media 104 as described above. It is preferable to arrange the tip and the media as level to each other as possible to insure a minimal force variation while scanning. According to a preferred embodiment, the contact force may range anywhere between about 1 nN and about 3 µN, and may preferably range between about 1 nN and about 200 nN. According to one embodiment, the Z direction actuation control system 118 may be adapted to generate a contact force F having differing magnitudes. Thus, the Z direction actuation control system 118 may be adapted to allow a first contact force $F_1$ of a first magnitude be applied to all of the domains in one scanning operation, and a second contact force $F_2$ of a second magnitude different from the first magnitude be applied to all of the domains in a subsequent scanning operation. In the alternative, the Z direction actuation control system 118 may be adapted to allow differing contact forces to be applied as between differing domains in a single scanning operation.

Figure 2:
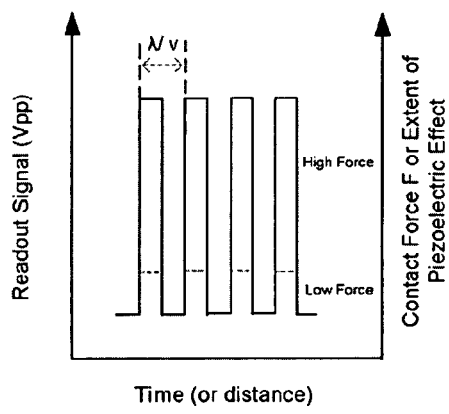
FIG. 2 is a graph of an exemplary voltage signal obtained from using the arrangement of FIG. 1.

Referring still to FIG. 1, arrangement 100 may include circuitry 118 which includes a charge amplifier device 120 ohmically coupled to the tip 110. The charge amplifier device may amplify the bit signal to a voltage signal $V_{pp}$ in response to the charge Q from the bits of pitch written in the domains of the media that the tip 110 detects by the electrical capacitive coupling across the tip-domain junction. The voltage signal $V_{pp}$ may be given by the following equation:

$$V_{pp}=Q/C_f \qquad (6)$$

where Cf represents the capacitance of a feedback capacitor installed on the charge amplifier circuit assembly to convert the charge input signal Q to the voltage output signal Vpp. According to an embodiment, the arrangement may be configured such that $C_f$ is equal to about 0.5 pF. According to embodiments, the direct piezoelectric effect in the embodiment of FIG. 1 amplifies the bit signal to $V_{pp}$ while the tip 110 is scanned on a domain 106 while applying a contact force F thereto at a scan speed v necessary to retrieve the bit signal with a desirably high data transfer rate. A high data transfer rate would correspond, for example, to about a 500 kbps (1 Mbps) readout of 50 nm pitch (half pitch) bits with the tip scanning at about 2.5 cm/s. A desirably high data transfer rate would correspond, for example, to a 5 Mbps (10 Mbps) readout of bits 10 nm pitch (half pitch) bits with the tip scanning at about 5 cm/s. Referring to FIG. 2, an exemplary schematic graph is shown plotting $V_{pp}$ versus time as a function of F, or of the direct piezoelectric effect in the embodiment of FIG. 1, for an arrangement similar to arrangement 100 of FIG. 1. As suggested in FIG. 2, a larger contact force generates larger piezoelectric charge, which in turn results into a more amplified $V_{pp}$ signal as plotted versus time.

Referring next to FIG. 3, a second embodiment is shown for an arrangement to store and read information. Arrangement 300 shown in FIG. 3 is similar to arrangement 100, except for the following differences: (1) arrangement 300 includes a tip 110 which may be adapted to apply an actually modulated contact force F to each of the domains 106; (2) according to a preferred embodiment, arrangement 300 is adapted to retrieve a current signal for the change in piezoelectric charges in the domains, as opposed to voltage signals as described above in relation to FIG. 1. Arrangement 300 may thus include an electric current detector 320 coupled to the tip, the current detector being adapted to detect a current signal for current induced as a result of the media 102 being compressed by the tip 110 in a modulated fashion. As a result of the above, like components as between arrangements 100 on the one hand, and 300 on the other hand, have been denoted with like reference numerals, and will not be described again with respect to FIG. 3, as they have already been described in relation to FIG. 1.

With respect to the application of a modulated contact force F between tip 110 and domains 106 as applicable to arrangement 300 of FIG. 3, the magnitude of the contact force may vary with time with respect to each one of the domains to allow a detection or characterization of ferroelectric domains or domains 106 in media 104 using tip 110. To detect the domains in the media, the tip may be moved using scanning actuation control system 116 in a manner as described above in relation to FIG. 1 to scan the media surface 122. At the same time, the tip or the media may be controlled to modulate the contact force F between the tip and the surfaces 112 of the domains for each given one of the domains. Due to a direct piezoelectric effect, a current generated when the contact force between tip 110 and the surfaces 112 of domains 106 is modulated is shown in equation (4) below:

$$i = (dQ/dt) = d_{33}(dF/dt) \quad (4)$$

where dF/dt is the changing rate of contact force, $d_{33}$ is the piezoelectric modulus of the media in the direction perpendicular to the media surface 122, and dQ/dt is the changing rate of polarization charge induced when the media 104 is compressed by the tip 110. According to the above regime, while the amplitude of the current in equation (4) above can be the same for both the UP domain (indicated with an upwardly pointing broken-lined arrow in FIG. 3) and for the DOWN domain (indicated with an downwardly pointing broken-lined arrow in FIG. 3), the current i for respective ones of the UP and DOWN domains will be 180 degrees out of phase with respect to one another. In order to address the above, electrical current detector 320 could be used to resolve or detect the above phase difference by detecting the domain orientations of the domains. The amplitude as obtained by equation (4) and detected by the electrical current detector 320 would then yield more detailed information about location polarization changes. Optionally, the arrangement 300 may include a lock-in amplifier 322 coupled to the tip, and adapted to pass signal only at a force modulation frequency of the tip in order to improve signal to noise ratio.

Referring still to FIG. 3, actuation control systems may be used to move a probe tip and the media toward one another in the Z direction in order to urge the tip 110 toward the domains 106 to effect a contact force F in a modulated fashion. Such actuation control systems may include, for example, at least one of electrostatic actuators, piezoelectric actuators, electromagnetic actuators and thermal actuators, as would be recognized by the skilled person. In the shown embodiment of FIG. 3, a Z actuation control system 318 is shown as being coupled to the tip 110 to actuate a Z direction motion of the same with respect to the media 104 as described above. The actuation control system 318 may include a mechanical vibrator to allow the tip to apply a modulated contact force to the domains. Alternatively, a function generator may be coupled to the PZT material of the media in order to drive the same, thus moving the media surface toward and away from the tip in a modulated fashion (not shown). According to a preferred embodiment, the contact force may be modulated within an amplitude range between about 1 nN and about 3 μN. Preferably, the contact force F is modulated in ranges below about 200 nN.

Referring still to FIG. 3, and referring also to equations (1) and (2) above with respect to a direct piezoelectric effect, a charge generated as a result of the application of a modulated force may be given by equation (7) below:

$$Q = d_{33}F = d_{33}F_o \sin \omega t \quad (7)$$

and a current generated as a result of the above may be given by equation (8) below:

$$i = dQ/dt = d_{33}F_o \omega \cos \omega t \quad (8)$$

where $F_o$ is the peak amplitude of the modulated force, and ω is given by the equation (9):

$$\omega = 2\pi/T = 2\pi f \quad (9)$$

where T is the period, and f is the frequency, of the modulation signal. In the case of the above, i may be given by its root mean square value to the extent that the force may be assumed to be sinusoidally modulated. In that case, current i may be given by equation (10):

$$i_{rms} = (d_{33}F_o\omega)/\sqrt{2} \quad (10)$$

Equation (9) above suggests that the generated current can be increased in the case of the embodiment of FIG. 3 by increasing the force modulation frequency or by increasing the modulated force peak amplitude. The equation also suggests that the sign of the generated current will reverse when the domain polarity changes. Assuming for example that the following values apply: $d_{33}$=100 pC/N; F=1 μN; and f=310 kHz, then i as given by equation (10) above would equal about 138 pA.

It is to be noted that, notwithstanding FIGS. 1 and 3, embodiments are not limited to the use of an arrangement where a single tip is used. Thus, an arrangement according to embodiments encompasses within its scope a plurality of probes including probe tips (not shown), such as, for example, tips extending from respective probes in the shape of cantilevers toward the surfaces 112 of the domains 106. Such probes may, for example, be arranged in a row with respect to top surfaces 112 of the domains 106. In addition, in the instant description with respect to the "applying a contact force F" is not meant to connote that the tip necessarily applies the same contact force F (i.e. a contact force F having the same magnitude) as between various ones of the domains. Rather, "applying a contact force F" as used herein connotes a force application between the tip and each of the domains during a scanning of said each of the domains by the tip, the contact force F possibly having: (1) different magnitudes (possible in the embodiment of FIG. 1) or different average magnitudes (possible in the embodiments of FIG. 3, for example) as between various ones of the domains; (2) having a modulated magnitude on each individual domain (possible in the embodiment of FIG. 3, for example); or (3) having the same magnitude (possible in the embodiment of FIG. 1, for example) or the same average magnitude (possible in the embodiment of FIG. 3, for example) throughout each scanning operation, based on application needs.

Figure 4:
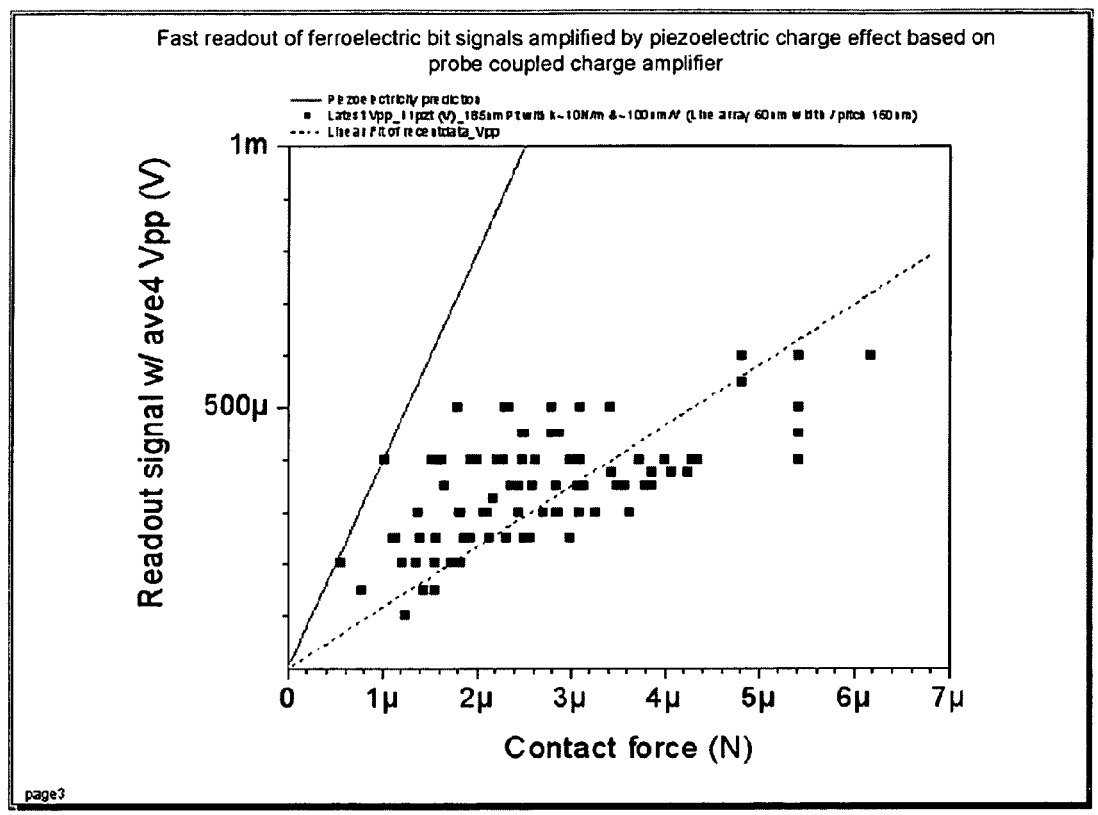
FIG. 4 is a graph plotting voltage signal versus contact force while using the arrangements of FIG. 1 within specific exemplary parameters.

Referring now to FIG. 4, a graph is shown of experimental data regarding readout signal $V_{pp}$ in Volts plotted versus contact force in μN for an exemplary arrangement similar to arrangement 100 according to an embodiment. Here, $C_f$=0.5 pf, and the voltage signal $V_{pp}$=Q/0.5 pf. The solid line in FIG. 4 predicts the linear amplification of the readout signal output with increasing contact force F according to the direct piezoelectric effect Q=(100 μC/N)×F. The solid squares in FIG. 4 represent a set of readout signal outputs from experimentation, where a 50 nm thick PZT epitaxially grown film was used on a SRO/STO substrate. A conductive probe tip was used to write a ferroelectric bit line array having a 60 nm width and a pitch of 160 nm. The tip was then scanned in contact with the media surface across the bit array at the speed 0.814 mm/s under a wide range of contact forces while recording the readout signal traces averaged over four times on the oscilloscope. The experimental data scatters around the dashed linear fit line in FIG. 4. The offset between the prediction and the experiment may be largely attributed to the presence of contamination layers on the tip and the media surfaces, which layers tend to make the tip-media junction electrical coupling less than ideal. The readout signal output may amplify when the contamination layers on the PZT are removed using oxygen plasma followed by nitrogen aided surface passivation for read/write stability. A tip surface treatment as noted above allows the tip-media contact to establish a better electrical coupling, and aids the process of signal boosting by a direct piezoelectric effect.

Referring next to FIG. 5, a flowchart 600 is shown of a method of reading information stored in a layer of ferroelectric media according to embodiments. In the description below, reference to components X/Y/Z is meant to signify a refers to component X in FIG. 1, or component Y in FIG. 3. The method depicted schematically in flowchart 600 may be performed for example using either of arrangements 100 and 300 shown in FIGS. 1 and 3, respectively. At block 602, method embodiments may include scanning the tip, such as tip 110 of FIGS. 1/3, over the domains 106/106, while applying a contact force F to the domains with the tip to generate a direct piezoelectric effect within the domains. At block 604, method embodiments may further include using circuitry, such as, for example, the circuitry including the charge amplifier device 120 of FIG. 1, or, in the alternative, the electrical current detector 320 of FIG. 3, coupled to the tip 110, to generate a signal in response to a electrical coupling between the tip 110 and the domains 106 while scanning the tip in contact with the domains, the signal corresponding to a readout signal for ferroelectric bit charges stored in the domains. According to one embodiment, the tip 110 may be scanned over the domains at a velocity to result in the signal having a frequency in the RF range. In the embodiments of FIGS. 1 and 3, for example, the tip 110 may be scanned across the surface while applying a contact force continuously during scanning. On the other hand, for the embodiments of FIGS. 1 and 3, for example, the tip 110 may be scanned across the surface of the media while applying a contact force during scanning only on the top surfaces 112 of the domains 106. The latter method embodiment may be performed using the arrangement 100 of FIG. 1 or the arrangement 300 of FIG. 3, for example, where tip 110 may apply a contact force F during scanning only to the top surfaces 112 of the domains 106, and not to intermediate boundary regions 113 disposed in between the domains 106. Additionally, in the embodiment of FIG. 1, according to another method embodiment, the tip 110 may be scanned across the surface of the media 104 while applying a first contact force during scanning on the top surfaces 112 of the domains 106, and while applying a second contact force during scanning on top surfaces of intermediate regions 113 disposed in between the domains 106, the second contact force being less than the first contact force. In the case of the latter embodiment, a desirable readout amplification by piezoelectricity may be achieved with a lower average contact force as compared with applying a constant contact force across the top surface 122 of media 104, in this way advantageously reducing wear on the tip.

Advantageously, embodiments provide a scanning tip readout arrangement and method for reading ferroelectric bit charges using a tip sensor by applying a force to the domains using the tip. The force may be constantly applied according to one embodiment on the one hand (FIG. 1), or it may be modulated according to another embodiment by virtue of modulating a force applied between the tip and each given domain (FIG. 3). Conventional piezoresponse signal readout arrangements and methods, such as PFM, disadvantageously rely on the detection of a cantilever's mechanical motion, which requires a complicated laser setup and optical alignment. Embodiments as shown in FIGS. 1 and 3, however, obviate the need for such complicated laser setup and optical alignment, as the signal detection according to embodiments allows reliance on a direct electrical coupling between the tip and the domain surface.

Advantageously, the embodiment as depicted with respect to FIG. 1 provides a faster scanning tip speed readout as compared with arrangements of the prior art. While the prior art may allow surface tracking at a 10 khz range at best, an embodiment such as the one shown in FIG. 1 may advantageously allow a readout rate up to a range within tens of Mhz. An embodiment according to FIG. 1 may thus increase tip speed and readout rate on the order 1000 times with respect to the prior art, thus being useful in next generation data storage/memory devices and markets. A fast readout rate is ensured according to embodiments by simply scanning the tip at a desirably high speed while maintaining a contact force with the surfaces of the domains. The direct piezoelectric effect present in the embodiment of FIG. 1, as described above, aids in the amplification of the fast readout signal, and thus improves the signal to noise ratio. An upper readout speed of embodiments is set electrically by the capacitance $C_j$ and the resistance $R_j$ across the media-tip junction. Cj and Rj define the time constant (RjCj) across the tip-media junction system. For example, bits can routinely be written using a 50 ns voltage pulse across the tip-media junction type. This indicates that one should be able to operate with a data retrieval rate that is in the 20 Mbps range (i.e., 1/50 ns or 1/RjCj) when one works with a similar type of tip-media junction resistance/capacitance combination. A fast readout in the Mhz range may be routinely achievable as the Cj (in the atto farad range) and the Rj (in the Giga to tera ohm range) are typical for a tip-media junction according to embodiments. A Mhz readout range is believed to be compatible to or better than any of solid-state non-volatile memory or data-storage devices available on the market today. The fastest scanning speed determined experimentally according to embodiments drove the tip in contact at about 2.5 cm/s while retrieving the readout signal over a ferroelectric bit line array (~120 nm width and pitch ~330 nm), embodiments not being limited to the above scanning speed. The above high speed result translates to the readout data transfer rate of about 75 kbps pitch (or ~150 kbps for a half pitch).

Advantageously, with respect to the embodiment of FIG. 3, that embodiment advantageously provides a force modulation and electrical current detection arrangement which is simple and which can be easily integrated into a small form factor, thus obviating the complicated optical setups (PFM) and high frequency electrical setups (SNDM) of the prior art. In addition, for the embodiment of FIG. 3, because the amplitude of the current signal depends on the changing rate of polarization charger instead of on the polarization charge itself when the domains are compressed by the cantilever tip, the contact force can be reduced as compared with a contact force required in the embodiment of FIG. 1, for example, and thus, in turn, a lifetime of the electrical sensing cantilever can be prolonged.

Figure 6:
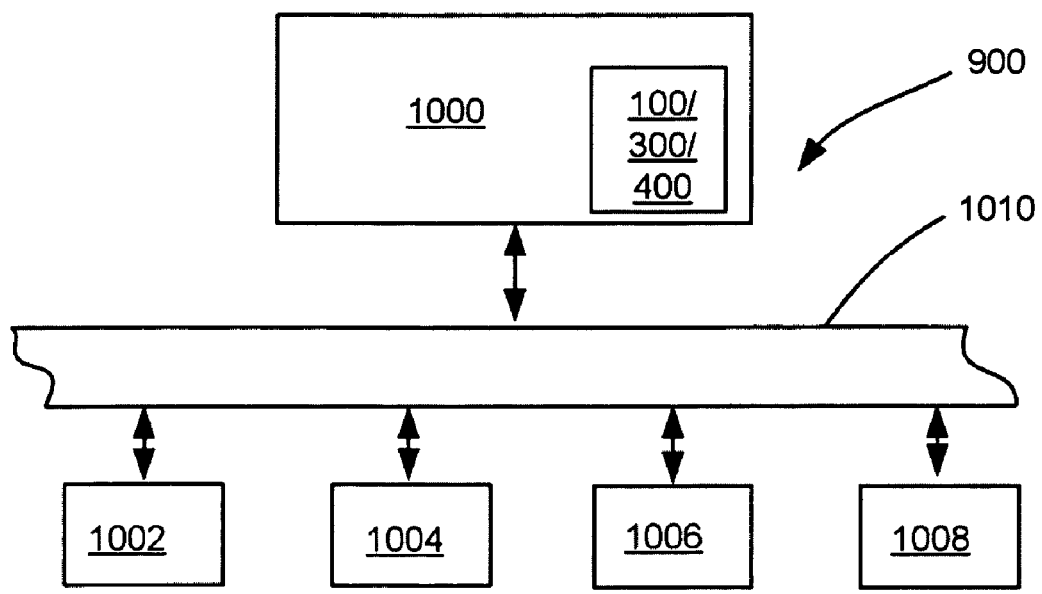
FIG. 6 is a schematic view of an embodiment of a system incorporating an arrangement as shown in FIG. 1 or FIG. 3.

Referring to FIG. 6, there is illustrated one of many possible systems 900 in which embodiments of the present invention may be used. In one embodiment, the electronic assembly 1000 may include an arrangement, such as arrangement 100 of FIG. 1, or arrangement 300 of FIG. 3. Assembly 1000 may further include a microprocessor. In an alternate embodiment, the electronic assembly 1000 may include an application specific IC (ASIC). Integrated circuits found in chipsets (e.g., graphics, sound, and control chipsets) may also be packaged in accordance with embodiments of this invention.

For the embodiment depicted by FIG. 6, the system 900 may also include a main memory 1002, a graphics processor 1004, a mass storage device 1006, and/or an input/output module 1008 coupled to each other by way of a bus 1010, as shown. Examples of the memory 1002 include but are not limited to static random access memory (SRAM) and dynamic random access memory (DRAM). Examples of the mass storage device 1006 include but are not limited to a hard disk drive, a compact disk drive (CD), a digital versatile disk drive (DVD), and so forth. Examples of the input/output module 1008 include but are not limited to a keyboard, cursor control arrangements, a display, a network interface, and so forth. Examples of the bus 1010 include but are not limited to a peripheral control interface (PCI) bus, and Industry Standard Architecture (ISA) bus, and so forth. In various embodiments, the system 900 may be a wireless mobile phone, a personal digital assistant, a pocket PC, a tablet PC, a notebook PC, a desktop computer, a set-top box, a media-center PC, a DVD player, and a server.

The various embodiments described above have been presented by way of example and not by way of limitation. Having thus described in detail embodiments of the present invention, it is understood that the invention defined by the appended claims is not to be limited by particular details set forth in the above description, as many variations thereof are possible without departing from the spirit or scope thereof.

What is claimed is:

1. An arrangement to store information, comprising:
   a layer including a ferroelectric media having one or more ferroelectric domains holding bit charges, a domain corresponding to information;
   a reading probe having a tip, wherein the media and the tip are adapted to move relative to one another at a plurality of scanning speeds such that the tip scans the ferroelectric domains of the media while applying a contact force to the domains to generate a direct piezoelectric effect within the domains;
   circuitry coupled to the tip and adapted to generate a signal in response to an electrical coupling between the tip and the domains while scanning the tip in contact with the domains, the signal corresponding to a readout signal for ferroelectric bit charges stored in the media.

2. The arrangement of claim 1, wherein the circuitry includes a charge amplifier device coupled to the tip, and wherein the signal is a voltage signal.

3. The arrangement of claim 1, wherein the circuitry includes an electrical current detector coupled to the tip, and wherein the signal is a current signal.

4. The arrangement of claim 1, wherein the tip includes a plurality of tips.

5. The arrangement of claim 1, wherein the tip is adapted to apply a force to domains between about 1 nN and about 3 μN.

6. The arrangement of claim 1, wherein the tip is adapted to apply contact forces of differing magnitudes.

7. The arrangement of claim 6, wherein the tip is adapted to apply a modulated contact force to each of the domains.

8. The arrangement of claim 7, further including a mechanical vibrator coupled to the tip and adapted to modulate the contact force on said each of the domains.

9. The arrangement of claim 7, further including a lock-in amplifier coupled to the tip and adapted to pass signals at a force modulation frequency only.

10. The arrangement of claim 1, wherein the tip is one of electrically conductive and semiconductive.

11. The arrangement of claim 1, wherein the media and the tip are adapted to move relative to one another such that the tip scans the ferroelectric domains of the media while applying a first contact force to the domains, and scans intermediate regions of the media in between the domains while applying a second contact force to the intermediate regions, the second contact force being smaller than the first contact force.

12. The arrangement of claim 1, wherein the media and the tip are adapted to move relative to one another such that a scanning speed of the tip on the domains is about 2.5 cm/s.

13. The arrangement of claim 1 wherein one of the plurality of scanning speeds is a scanning speed that causes the signal to have a frequency in the radio-frequency (RF) range.

14. A method of reading information stored in a layer of a ferroelectric media including ferroelectric domains having bit charges using a tip, the method comprising:
   scanning the tip over the domains at a plurality of scanning speeds while applying a contact force to the domains with the tip to generate a direct piezoelectric effect within the domains;
   using circuitry coupled to the tip to generate a signal in response to an electrical coupling between the tip and the domains while scanning the tip in contact with the domains, the signal corresponding to a readout signal for ferroelectric bit charges stored in the domains.

15. The method of claim 14, wherein using includes using a charge amplifier device coupled to the tip, wherein the signal is a voltage signal.

16. The method of claim 14, wherein using includes using an electrical current detector coupled to the tip, wherein the signal is a current signal.

17. The method of claim 14, wherein the ferroelectric media has a continuous surface including surfaces of the domains, and wherein scanning includes scanning across the continuous surface while applying a contact force continuously during scanning.

18. The method of claim 14, wherein the tip includes a plurality of tips.

19. The method of claim 14, wherein applying a contact force includes applying a contact force to the domains between about 1 nN and 3 μN.

20. The method of claim 14, wherein applying a contact force includes applying contact forces of differing magnitudes to the domains.

21. The method of claim 20, wherein applying includes using to the tip to apply a modulated contact force to each of the domains.

22. The method of claim 21, wherein applying includes using a mechanical vibrator coupled to the tip to modulate the contact force on said each of the domains.

23. The method of claim 21, wherein the circuitry includes a lock-in amplifier coupled to the tip and adapted to pass signals at a force modulation frequency only.

24. The method of claim 14, wherein the tip is one of electrically conductive and semiconductive.

25. The method of claim 14, wherein scanning comprises scanning a surface of the media while applying a first contact force to the domains when scanning the domains and while applying a second contact force to intermediate regions of the media in between the domains when scanning the intermediate regions, the second contact force being smaller than the first contact force.

26. The method of claim 14, wherein the signal has a frequency in the radio-frequency (RF) range.

27. A system comprising:
   an electronic assembly comprising:
      an arrangement to store information, comprising:
         a layer including a ferroelectric media having one or more ferroelectric domains holding bit charges, a domain corresponding to information;
         a reading probe having a tip, wherein the media and the tip are adapted to move relative to one another at a plurality of scanning speeds such that the tip scans the ferroelectric domains of the media while applying a contact force to the domains to generate a direct piezoelectric effect within the domains;
         circuitry coupled to the tip and adapted to generate a signal in response to an electrical coupling between the tip and the domains while scanning the tip in contact with the domains, the signal corresponding to a readout signal for ferroelectric bit charges stored in the media; and a graphics controller coupled to the electronic assembly.

28. The system of claim 27, wherein the circuitry includes a charge amplifier device coupled to the tip, and wherein the signal is a voltage signal.

29. The system of claim 27, wherein the circuitry includes an electrical current detector coupled to the tip, and wherein the signal is a current signal.

30. The system of claim 27, wherein the tip is adapted to apply a modulated contact force to each of the domains.

31. The system of claim 27 wherein one of the plurality of scanning speeds is a scanning speed that causes the signal to have a frequency in the radio-frequency (RF) range.

* * * * *